July 22, 1969      H. S. RUEKBERG      3,456,290
TANDEM BLOW MOLDING APPARATUS
Filed Oct. 20, 1965
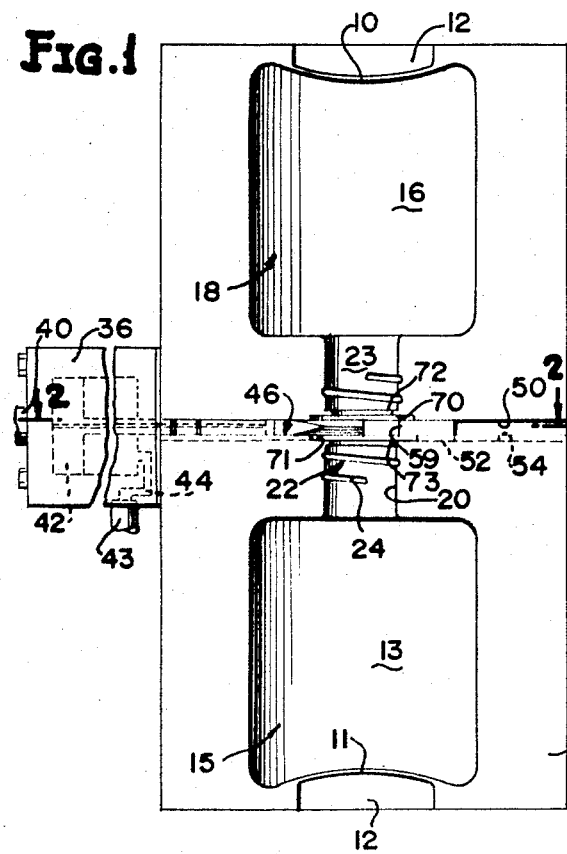
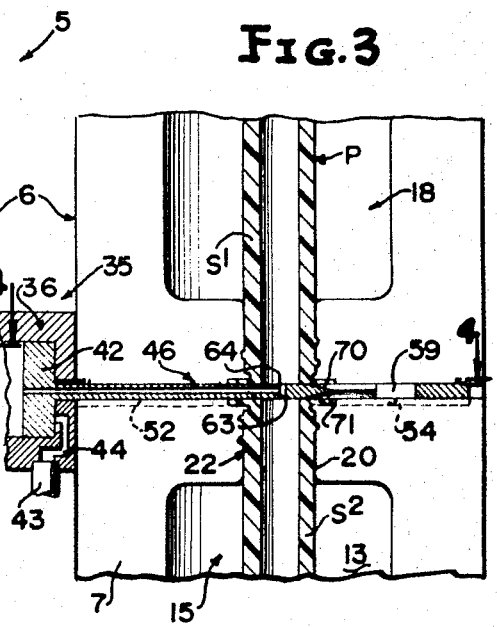
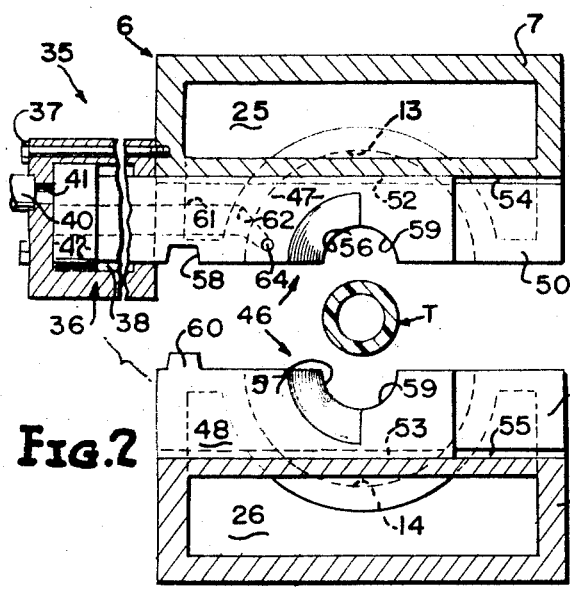
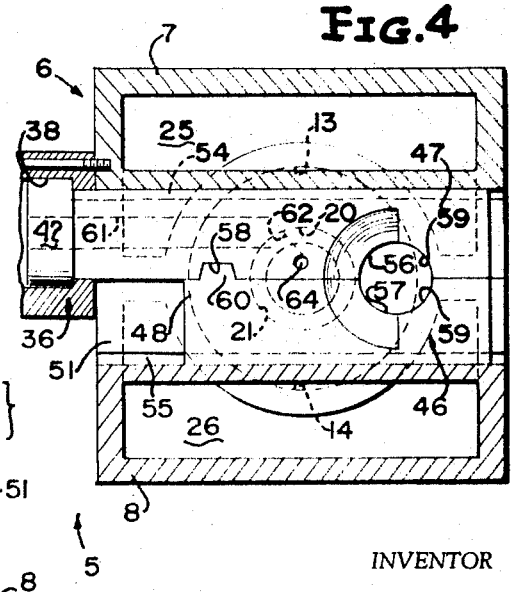
INVENTOR
HERBERT S. RUEKBERG
BY
Mason, Porter, Diller & Brown
ATTORNEYS

United States Patent Office 3,456,290
Patented July 22, 1969

3,456,290
TANDEM BLOW MOLDING APPARATUS
Herbert S. Ruekberg, Highland Park, Ill., assignor to Continental Can Company, Inc., New York, N.Y., a corporation of New York
Filed Oct. 20, 1965, Ser. No. 498,368
Int. Cl. B29d 23/03
U.S. Cl. 18—5                          15 Claims

ABSTRACT OF THE DISCLOSURE

This disclosure relates to an apparatus for blow molding plastic articles from a tube of plastic material by closing a pair of mold bodies to interlock a pair of severing blades. The blades are moved to sever the tube into a pair of sections, and aperture means in one of the blades introduces pressurized air into the severed sections to inflate the sections to the configuration of the molds. Means are provided for receiving plastic material displaced during the severing operation, and means are further provided for preventing the introduction of the air between the severed plastic sections and the mold cavities.

---

Tandem molds are known which have a plurality of cavities in each of which is simultaneously blown a hollow article, such as a container or other hollow object, by extruding and introducing a hot plastic tube between sections of the tandem mold and closing the mold to pinch off opposite ends of the tube. A blow needle is then inserted into the interior of the clamped off tube section and pressurized air is introduced through the blow needle into the interior of the section to expand the section to the configuration of the mold cavities, thereby simultaneously blowing a hollow article in each cavity of the tandem mold.

When it is desired to blow bottles or similar containers in a tandem mold, the mold is generally provided with axially aligned body cavities joined together by a central neck cavity. A tube of hot plastic material is extruded and introduced between sections of the tandem mold which are then closed. The closing of the mold pinches off a portion of the tube at the mold ends in a well known manner. A blow needle at the location of the central neck cavity is then introduced into the clamped off section of the tube and pressurized air expands the section to the configuration of the mold cavities to form a container in each cavity joined at the neck portions thereof. The blow needle is withdrawn, the tandem mold is opened and the blown and still joined containers are removed.

After the containers have been removed they are necessarily separated by severing or cutting a section of the plastic material in the area of the container necks. The removed material forms no part of either of the containers, and it is thus waste material which is discarded.

After the containers have been separated it is also generally necessary to perform several operations to finish the containers. For example, the severing operation may be followed by a reaming operation by which the necks of the containers are reamed out in a conventional manner. The lip or rim of each container can also be faced off to a smooth and flat finish.

Irrespective of finishing operations, containers which are blow molded in tandem molds are wasteful of material and the additional step of performing a severing operation must necessarily be performed.

It is, therefore, an object of this invention is to provide a novel tandem mold for making hollow plastic articles from a plastic tube of extruded material including a mold cavity defining a plurality of article forming cavity portions, blade means for severing a portion of the plastic tube into a plurality of sections, the blade means including a plurality of blade members, and means for introducing pressurized fluid through at least one of the blade members into each of the tube sections for expanding the sections into contact with the wall portions of the mold cavity thereby forming separate unconnected articles.

Still another object of this invention is to provide a novel apparatus for making hollow plastic articles from a plastic tube including a mold having wall portions defining mold cavities, means for severing a plastic tube into separate unconnected tube sections, means for pneumatically expanding the sections to urge the sections into contact with the wall portions of the cavities to form individual separate unconnected articles, and sealing means for preventing the introduction of the pneumatic expanding medium between the tube sections and the cavities.

A further object of this invention is to provide a novel apparatus for making hollow plastic articles from a plastic tube comprising a sectional tandem mold having first and second article defining cavities joined by an intermediate cavity portion, means for axially separating the tube into at least two spaced unconnected sections after the sectional mold has been closed, the separating means being a blade member carried by each mold section, means for interlocking the blade members when the mold is closed, means for rapidly moving at least one of the blade members across the intermediate cavity portion to sever a plastic tube therein into unconnected separate tube sections and means for introducing pressurized air into each section thereby expanding the same into contact with the cavities to form separate unconnected articles therefrom.

With the above and other objects in view that will hereinafter appear, the nature of the invention will be more clearly understood by reference to the following detailed description, the appended claims and the several views illustrated in the accompanying drawing.

In the drawing:

FIGURE 1 is an elevational view of one section of a sectional tandem blow mold constructed in accordance with this invention, and illustrates a blade of a severing mechanism mounted for reciprocation to cut a plastic tube to form two separate unconnected tube sections prior to the blow molding thereof in the mold.

FIGURE 2 is a sectional view taken substantially along line 2—2 of FIGURE 1 and more clearly illustrates the blade or blade member of the mold section and a second blade member carried by a second mold section of the tandem mold.

FIGURE 3 is a fragmentary elevational view of the mold section of FIGURE 1 with parts thereof shown in section, and clearly illustrates a passage in one of the blade members for introducing air under pressure into severed sections of a pinched off tube portion of the sectional mold.

FIGURE 4 is a sectional view taken substantially along line 4—4 of FIGURE 3, and illustrates the mold sections of the mold in the closed position thereof during a blow molding operation.

An apparatus constructed in accordance with this invention is shown in the drawings and is generally designated by the reference numeral 5. The apparatus 5 comprises a sectional tandem blow mold 6 having mold bodies or sections 7 and 8. The mold sections 7 and 8 are conventionally reciprocally mounted (not shown) for movement from an open position (FIGURE 2) to the closed position thereof shown in FIGURE 4 of the drawing.

A tube T of hot plastic material is extruded downwardly as viewed in FIGURE 1 of the drawing from a conventional extrusion machine (not shown) between the mold sections 7 and 8, as is best illustrated in FIGURE 2, when these sections are in the open position thereof. The mold sections 7 and 8 are then closed (FIGURE 4) and a portion P (FIGURE 3) of the plastic tube T is pinched off between identical upper and lower ends 10 and 11 of the respective mold sections 7 and 8. A flash cavity 12 adjacent each of the ends 10, 11 receives the material of the tube T which is displaced when the mold sections 7 and 8 are closed in a conventional manner.

A wall portion 13 of the mold section 7 opposes a wall portion 14 (FIGURES 2 and 4) of the mold section 8 to define therebetween a mold cavity 15 contoured to the general configuration of an upright container or bottle. A wall portion 16 of the mold section 7 similarly opposes an identical wall portion (not shown) of the mold section 8 to similarly define therebetween a mold cavity 18 (FIGURES 1 and 3) contoured to the general configuration of an inverted container or bottle. The wall portions 13 and 16 of the mold section 7 are joined together by an integral wall portion 20 opposing a similar wall portion 21 (FIGURE 4) of the mold section 8 to define therebetween an intermediate neck cavity 22 which is grooved at 23 and 24 in both mold sections 7 and 8. The grooving 23 and 24 forms exterior threads on the necks of containers blow molded in the tandem blow mold 6 in a manner to be described more fully hereafter.

Chambers 25 and 26 are formed in the mold sections 7 and 8 respectively (FIGURES 2 and 4). The chambers 25 and 26 are cooling chambers into which a cooling medium is continually introduced, circulated and withdrawn during a blow molding operation, as will be more apparent hereinafter.

Prior to expanding the pinched off portion P of the tube T a severing mechanism 35 of the apparatus 5 is actuated to cut the pinched off portion P into two separate unconnected sections $S^1$ and $S^2$ (FIGURE 3). The severing mechanism 35 comprises a housing or air cylinder 36 secured to the mold section 7 by a plurality of identical bolts 37. Fluid under pressure, such as compressed air, is introduced into a chamber 38 of the housing 36 through a conduit 40 and a port 41 (FIGURE 2) to urge a reciprocal piston 42 from the position shown in FIGURES 1 and 2 to the position thereof shown in FIGURES 3 and 4 after the mold sections 7 and 8 have been closed. A similar conduit 43 and a port 44 (FIGURE 3) urge the piston 42 from the position shown in FIGURE 3 to the position shown in FIGURE 1. During the movement of the piston 42 from left-to-right as viewed in the drawing, air is vented from the chamber 38 in a conventional manner through the port 44 and the conduit 43 while movement of the piston 42 from right-to-left is similarly accompanied by a venting of the chamber 38 through the port 41 and the conduit 40.

The piston 42 forms a portion of a blade means 46 which both severs and separates the pinched off portion P of the tube T into the sections $S^1$ and $S^2$, and introduces pressurized air into the severed tube sections $S^1$ and $S^2$ during a blowing cycle of the apparatus 5.

The blade means 46 comprises a pair of substantially identical blade or blade members 47 and 48 received and guided by slots 50 and 51 respectively in the respective mold sections 7 and 8.

Each of the blades 47 and 48 is generally L-shaped in transverse cross-section as viewed in FIGURES 2 and 4. A depending leg or tongue 52 and 53 on the underside of the respective blades 47 and 48 is received in a respective groove 54 and 55 opening upwardly through upper surfaces (unnumbered) of the respective slots 50 and 51. The engagement between the tongues 52, 53 and the respective grooves 54 and 55 insure accurate guiding of the blade means 46 during a cycle of the apparatus 5 in a manner to be described more fully hereafter.

The blade 47 has a cutting edge 56 opposing a substantially identical cutting edge 57 of the blade 48, as is best illustrated in FIGURES 2 and 4 of the drawing. The cutting edge 56 and 57 each set-off an angle of approximately ninety degrees, and each cutting edge 56, 57 terminates at an associated flat blade portion 59 which similarly sets off an angle of approximately ninety degrees. The cutting edges 56, 57 and the flat blade portions 59, 59 define a generally circular opening when the mold sections 7 and 8 are closed (FIGURE 4) and the opening is slightly larger than the external diameter of the tube of plastic material T.

The blade 47 also includes a keyway 58 in transverse alignment with a key 60 of the blade 48. When the mold bodies or sections 7 and 8 are moved transversely toward one another from the open position illustrated in FIGURE 2 of the drawing to the closed position thereof, the key 60 is received in the keyway 58 of the blade 47 and any movement imparted to the blade 47 by the reciprocal piston 42 is in turn imparted to the blade 48.

A longitudinal passage 61 having an offset portion 62 is formed in the blade 47 and terminates substantially midway between the edge 56 and the keyway 58 in oppositely directed ports 63 and 64 (FIGURE 3) opening through the blade 47 toward the respective cavities 15 and 18. The passage 61, the passage portion 62 and the ports 63 and 64 establish a path of fluid communication into the sections $S^1$ and $S^2$ of the pinched off tube portion P from the chamber 38 of the severing means 35 in a manner clearly illustrated in FIGURE 3 of the drawing.

A cycle of the apparatus 5 is initiated by first extruding the tube T of plastic material between the open mold bodies 7 and 8 in the manner illustrated in FIGURE 2 of the drawing, and thereafter closing the mold bodies 7 and 8 whereupon the key 60 of the blade 48 is received in the keyway 58 of the blade 47 and the semi-circular edges 56 and 57 surround the exterior of the tube T. The closing of the mold bodies 7 and 8 pinches off the portion P of the tube T and air under pressure is then introduced from a conventional source into the chamber 38 through the conduit 40 and the port 41 to rapidly drive the piston to the position thereof shown in FIGURES 3 and 4 of the drawing, whereupon the edges 56 and 57 of the respective blades 47 and 48 completely sever and separate the plastic tube to form the two axially separate unconnected tube sections $S^1$ and $S^2$ (FIGURE 3). Both of the sections $S^1$ and $S^2$ are then simultaneously expanded into contact with the interior surfaces 13, 16 and 20 of the respective mold cavities 15, 18 and 22 by the pressurized air passing from the chamber 38 through the passage 61, the offset portion 62 and the oppositely opening ports 63, and 64 opening into the respective sections $S^2$ and $S^1$ to expand the same into containers corresponding to the configuration of the mold cavities. After the sections $S^1$ and $S^2$ have been expanded or blown to form the articles or containers (not shown) the piston 42 and the blade 47 carried thereby is returned to the position illustrated in FIGURE 1 of the drawing by the introduction of air under pressure into the chamber 38 through the conduit 43 and the port 44. The blade 47 draws the blade 48 to the leftmost positions thereof due to the engagement of the keyway 58 and the key 60 in a manner clearly illustrated in FIGURES 2 and 4 of the drawing. This withdrawal of the blade members 47 and 48 after the severing and separating of the plastic tube T and the expanding thereof in the mold 6 is preferably performed after the cooling medium in the chambers 25 and 26 completely sets the blown containers. This assures the separation of the blown containers after the withdrawal of the blades 47 and 48 thereby precluding the rejoinder of the severed plastic material.

It is also possible to immediately withdraw the blades 47 and 48 after the containers have been blown but before the same are completely set, and under some circumstances, it is preferable to rapidly withdraw the blades 47 and 48 immediately upon the blowing of the articles or containers in the apparatus 5

During the cutting of the pinched off portion P into the sections $S^1$ and $S^2$ by the edges 56 and 57 of the respective blades 47 and 48 in the manner heretofore described, the wall of the pinched off portion P is preferably supported against collapsing internally as the same is severed by introducing and maintaining pressurized air in the tube portion P. This is accomplished during the conventional extruding of the plastic tube T by directing air under pressure in a known manner at relatively low pressure into the interior of the extruded tube T to prevent the same from collapsing during the extruding thereof.

In accordance with this invention, air is preferably similarly introduced into the tube T at the time the tube is extruded at a pressure of approximately one pound per square inch which is entrapped in the portion P when the same is pinched off by the ends 10 and 11 of the mold 6 in the manner heretofore described. This entrapped air under pressure in the pinched off portion P supports the wall thereof against collapsing internally during the severing operation performed by the blade means 46 in the manner heretofore described.

In addition to supporting the pinched off portion P against collapsing during the severing thereof by the blade means 46, the mold bodies 7 and 8 are each provided with substantially identical semi-circular relief portions 70 and 71 (FIGURE 1) above and beneath the blade means 46 in the area of the neck cavity 22. As the blade means 46 severs the pinched portion P into the sections S¹ and S², the plastic material is displaced by the blades 47 and 48 into the recesses 70 and 71 in a manner clearly illustrated in FIGURE 3 of the drawing. The relieved portions 70 and 71 thus form chambers for receiving the plastic material displaced during the severing operation to insure a cleaner cut or severing of the pinched off tube portion P Above each of the semi-circular relief portions 70 is a semi-circular radially inwardly directed rib 72 (FIGURE 1) while an identical radially inwardly directed rib 73 is positioned beneath each of the relief portions 71. When the mold bodies 7 and 8 are closed, the ribs 72 and 73 are forced into the exterior of the plastic tube T (FIGURE 3) and become slightly embedded therein to create a seal between the exterior surface of the tube T and the wall of the neck cavity 22. This seal prevents any of the air emitted from the ports 63 and 64 from leaking around the exterior of the tube T into any of the mold cavities 22, 15 or 18.

In addition to the foregoing, modifications of the disclosed apparatus 5 as well as the method described herein will be apparent to those skilled in the art familiar with this disclosure, and such modifications are considered within the scope of this invention. For example, while the blade means 46 has been described as being preferably reciprocated by pressurized air in both directions of its movement, suitable spring means could be employed to return the blade 47 and the blade 48 keyed thereto from the position shown in FIGURE 4. Such a spring could encompass the blade 47 between the piston 42 and the wall (unnumbered) of the housing 36, contacting the mold body 7. Compressed air would load the piston during the movement to the position shown in FIGURE 2, and upon release of the air pressure the spring would drive the piston 42 to the position shown in FIGURES 1 and 2 of the drawing. Irrespective of whether the blade means 46 are reciprocated by spring means, pneumatic means, or a combination of both or equivalent means, it is highly imperative to a successful operation of the apparatus 5 that any such means drive the piston 42 extremely rapidly during the severing operation, and any means capable of driving the blade means 46 in such a rapid manner is considered within the scope of this invention.

As has been heretofore noted, the external diameter of the tube of plastic material T is preferably slightly less than the diameter of the opening (unnumbered) formed by the cutting edges 56 and 57 of the respective blades 47 and 48. The external diameter of the tube T is also either greater than equal to or slightly less than the internal diameter of the neck cavity 22. The tube T can be of a smaller external diameter than the neck cavity 22 because of the sealing ribs 72 and 73 which project radially inwardly beyond the surfaces defining the neck cavity 22.

Although only preferred embodiments of the invention have been specifically illustrated and described herein, it is to be understood that other minor modifications may be made in the invention within the spirit and scope thereof as defined in the appended claims.

I claim:

1. Apparatus for making a hollow plastic article from a plastic tube comprising a mold having wall portions defining a mold cavity adapted to receive the plastic tube, blade means for severing a portion of the plastic tube into a plurality of sections, said blade means including a plurality of blade members, and means for introducing fluid through one of the blade members into the tube sections for expanding the tube into contact with said wall portions of the mold cavity.

2. An apparatus for making hollow plastic articles from a plastic tube comprising a mold having wall portions defining a mold cavity adapted to receive the plastic tube, said cavity adapted to receive the plastic tube, said cavity including a plurality of article forming cavity portions, a plurality of cooperable relatively movable blade means for severing a portion of a plastic tube received in the mold cavity and means for introducing fluid through at least one of said blade means into the plastic tube in axilially opposite directions for expanding portions of the tube into contact with said wall portions thereby forming an article in each of the article forming cavity portions of the mold.

3. Apparatus for making a hollow plastic article from a plastic tube comprising a mold, said mold defining a mold cavity adapted to receive a plastic tube when the mold is open, means for dividing said tube into tube sections, said dividing means being at least a pair of blade members, means for moving said blade members rapidly through the tube thereby completely severing and separating the same into said sections, and means for introducing presurized fluid through at least one of the blade members into at least one of the tube sections for expanding the same into contact with the mold cavity and form an article therefrom.

4. Apparatus for making hollow plastic articles from a plastic tube comprising a mold, said mold defining a mold cavity adapted to receive a plastic tube when the mold is open, means for severing said tube into sections, said severing means being a plurality of blade members, means at least temporarily joining said blade members, mean for moving said blade members rapidly to completely sever and separate the tube into said sections, and means of introducing pressurized fluid into the tube sections for expanding the same into contact with the mold cavity.

5. The apparatus as defined in claim 4 wherein said joining means are key and keyway means of the blade members which are interlockable when the mold is closed.

6. The apparatus as defined in claim 4 wherein said moving means acts directly against only one of said blade members and the joining means imparts the movement of said only one blade member to at least a second blade member.

7. The apparatus as defined in claim 4 wherein said means for introducing pressurized fluid into the tube sections is a passage formed in at least one of said blade members.

8. The apparatus as defined in claim 4 wherein said means for introducing pressurized fluid into the tube sections is a passage formed in only one of said blade members.

9. Apparatus for making hollow plastic articles from a plastic tube comprising a mold having wall portions defining mold cavities, means for severing a plastic tube into separate sections in said mold, means for pneumatically expanding the sections to urge the sections into contact with the wall portions of the cavities, and means for preventing the introduction of the penmatic expanding medium between the sections and the cavities.

10. The apparatus as defined in claim 9 wherein said last mentioned means is a radially inwardlymost directed wall portion of the cavities adjacent said severing means.

11. The apparatus as defined in claim 9 wherein said severing means is a blade, said expanding means includes a passage means in said blade opening into said cavities, and said means for preventing the introduction of expanding medium into the cavities is an inwardly directed sealing wall portion of the cavities adjacent opposite sides of the blade.

12. Apparatus for making a plurality of hollows separate plastic articles from sectioned portions of a plastic tube comprising a sectional mold having a first and second article defining cavities joined by an intermediate cavity portions, means or axially separating the tube into at least two spaced unconnected sections after the sectional mold is closed, said separating means being a blade member carried by each mold section, means for interlocking said blade members when said mold is closed, means for rapidly moving at least one of said blade members across the intermediate cavity portion to sever a plastic tube therein into unconnected separate sections, and means for introducing pressurized air into each section thereby expanding the same into contact with said cavities to form separate articles therefrom.

13. Apparatus for making a hollow plastic article from a plastic tube comprising a mold having wall portions defining a mold cavity adapted to receive the plastic tube, blade means for severing a portion of the plastic tube into a plurality of sections, mean for introducing fluid through the blade means for expanding at least one of the plurality of sections into contact with adjacent wall portions of the mold cavity, and chamber means for receiving plastic material displaced during the severing of the plastic tube by the blade means thereby ensuring a clean severance of the plastic tube.

14. Apparatus for making hollow plastic articles from a plastic tube comprising a mold having wall portions defining mold cavities, means for severing a plastic tube into separate sections in said mold, means for pneumatically expanding the sections to urge the sections into contact with the wall portions of the cavities, and chamber means for receiving plastic material displaced during the severing of the plastic tube by said severing means thereby ensuring a clean severance of the plastic tube.

15. The apparatus as defined in claim 14 wherein said chamber means open axially toward each other and are disposed at opposite sides of said severing means.

References Cited

UNITED STATES PATENTS

Re. 23,564  10/1952  Hobson.
3,217,072  11/1965  Schaich _____ 264—150 X

WILBUR L. McBAY, Primary Examiner

U.S. Cl. X.R.

83—169; 264—94, 159